United States Patent
Hreha et al.

(10) Patent No.: US 10,305,646 B2
(45) Date of Patent: May 28, 2019

(54) PROTECTED OVERLAY OF ASSIGNED FREQUENCY CHANNELS

(71) Applicant: Space Systems/Loral, LLC, Palo Alto, CA (US)

(72) Inventors: William Hreha, San Jose, CA (US); David Grybos, San Jose, CA (US)

(73) Assignee: Space Systems/Loral LLC, Palo Alto, CA (US)

(*) Notice: Subject to any disclaimer, the term of this patent is extended or adjusted under 35 U.S.C. 154(b) by 88 days.

(21) Appl. No.: 15/163,465

(22) Filed: May 24, 2016

(65) Prior Publication Data

US 2017/0214500 A1    Jul. 27, 2017

Related U.S. Application Data (60) Provisional application No. 62/286,154, filed on Jan. 22, 2016.

(51) Int. Cl.
*H04L 5/00*      (2006.01)
*H04W 4/08*     (2009.01)
(Continued)

(52) U.S. Cl.
CPC ......... *H04L 5/0023* (2013.01); *H04B 1/7136* (2013.01); *H04B 7/18513* (2013.01);
(Continued)

(58) Field of Classification Search
None
See application file for complete search history.

(56) References Cited

U.S. PATENT DOCUMENTS

| 5,283,587 A | 2/1994 | Hirshfield et al. |
| 5,539,415 A | 7/1996 | Metzen et al. |

(Continued)

FOREIGN PATENT DOCUMENTS

| WO | WO2000/049736 A1 | 8/2000 |
| WO | WO2013/130778 A1 | 9/2013 |
| WO | WO2013/130812 A1 | 9/2013 |

OTHER PUBLICATIONS

Jocic, L.B., et al., "Adapting Commercial Satellites to Military Communication Needs," Aerospace Applications Conference, IEEE Proceedings, Feb. 1996, 13 pages.

(Continued)

*Primary Examiner* — Donald L Mills
(74) *Attorney, Agent, or Firm* — Vierra Magen Marcus LLP (57) ABSTRACT

A communication platform such as a spacecraft, airborne platform, or terrestrial line of site wireless platform is provided with adaptive digital beamforming. The satellite digitizes a full spectrum allocation for digital channelization. A channelization engine can determine a particular user or user group associated with an uplink signal. In this manner, the communication platform can apply different processing based on the user or group associated with a signal. For example, the communication platform receives uplink signals associated with a first user group and a second user group in one embodiment. The platform dynamically generates one or more spot beams for the first user group and the second group. The platform discriminates the uplink signals to apply frequency hopping for the downlink frequency channel assignments to the second user group while the downlink frequency channel assignments for the first user group remain fixed.

22 Claims, 7 Drawing Sheets

(51) Int. Cl.
  *H04B 1/7136* (2011.01)
  *H04W 16/10* (2009.01)
  *H04B 7/185* (2006.01)
  *H04B 7/204* (2006.01)
  *H04W 72/04* (2009.01)
  *H04W 84/06* (2009.01)

(52) U.S. Cl.
  CPC ............ *H04B 7/2041* (2013.01); *H04W 4/08* (2013.01); *H04W 16/10* (2013.01); *H04W 72/0453* (2013.01); *H04W 84/06* (2013.01); *H04B 2201/71307* (2013.01)

(56) References Cited

U.S. PATENT DOCUMENTS

| | | | |
|---|---|---|---|
| 5,623,269 | A | 4/1997 | Hirshfield et al. |
| 5,909,191 | A | 6/1999 | Hirshfield et al. |
| 6,016,124 | A | 1/2000 | Lo et al. |
| 6,049,561 | A | 4/2000 | Pezzlo et al. |
| 6,052,406 | A | 4/2000 | Epstein et al. |
| 6,118,805 | A | 9/2000 | Bergstrom et al. |
| 6,240,072 | B1 | 5/2001 | Lo et al. |
| 6,381,053 | B1 | 4/2002 | Fathallah et al. |
| 6,400,696 | B1 | 6/2002 | Hreha |
| 6,507,600 | B2 | 1/2003 | Schilling |
| 6,694,154 | B1 * | 2/2004 | Molnar ............... H04B 7/18532 455/277.1 |
| 6,725,277 | B2 | 4/2004 | Grybos |
| 6,741,633 | B1 | 5/2004 | Cangiani et al. |
| 6,751,251 | B2 | 6/2004 | Lansford |
| 6,865,215 | B1 | 3/2005 | Russell et al. |
| 7,219,132 | B2 | 5/2007 | Hreha et al. |
| 7,233,770 | B2 | 6/2007 | Williamson et al. |
| 7,542,716 | B2 | 6/2009 | Bell et al. |
| 7,579,987 | B2 | 8/2009 | Cohen et al. |
| 7,580,444 | B2 | 8/2009 | Brown et al. |
| 7,787,819 | B2 | 8/2010 | Walker et al. |
| 7,978,135 | B2 * | 7/2011 | Churan ................ H04B 7/0617 342/377 |
| 8,077,652 | B2 | 12/2011 | Thesling |
| 8,270,899 | B2 | 9/2012 | Walker et al. |
| 8,296,051 | B2 | 10/2012 | Cohen et al. |
| 8,368,596 | B2 | 2/2013 | Tiezzi et al. |
| 2002/0077099 | A1 | 6/2002 | LaPrade |
| 2004/0185775 | A1 * | 9/2004 | Bell ................... H04B 7/18515 455/12.1 |
| 2007/0264929 | A1 | 11/2007 | Chen |
| 2008/0298299 | A1 * | 12/2008 | Thesling ............ H04B 7/18582 370/316 |
| 2010/0035604 | A1 * | 2/2010 | Dutta ................. H04B 7/18513 455/427 |
| 2011/0007647 | A1 * | 1/2011 | Miller ................ H04B 7/18586 370/252 |
| 2011/0255570 | A1 | 10/2011 | Fujiwara |
| 2013/0301681 | A1 | 11/2013 | Hassan et al. |
| 2014/0286236 | A9 * | 9/2014 | Miller .................... H04B 7/212 370/326 |
| 2017/0026205 | A1 * | 1/2017 | Agee ........................ H04L 25/08 |
| 2017/0085307 | A1 * | 3/2017 | Yazdani ............. H04B 7/18502 |
| 2017/0288769 | A1 * | 10/2017 | Miller .................... H04B 7/212 |

OTHER PUBLICATIONS

Wilcoxson, Don, "Advanced Commercial Satellite Systems Technology for Protected Communications," 2011 Military Communications Conference, Nov. 2011, 6 pages.

Haynes, Toby, "A Primer on Digial Beamforming," Spectrum Signal Processing, Mar. 26, 1998, 15 pages.

"Boeing Sends Protected Government Signal through Commercial Satellite," [http://boeing.mediaroom.com/Boeing-Sends-Protected-Goverment-Signal-through-Commercial-Satellite], Sep. 18, 2013, 1 page.

Pelton, DR. Joseph N., "Satellite Security and Performance in an Era of Dual Use," [http://spacejournal.ohio.edu/issue6/pdf/pelton.pdf], Dec. 2003, 8 pages.

Harris Corporation, "Radio Communications in the Digital Age," vol. 1, HF Technology, Edition 2, Oct. 2005, 98 pages.

Prabakaran, D., "Spread-Spectrum Technology and Its Applications," Electronics for You, [www.efymag.com], Dec. 2005, 7 pages.

"Technology; Military Now Often Enlists Commercial Technology," The New York Times, Mar. 10, 2003, 3 pages.

Cacas, Max, "When Budgets Go Lean, Military Communications Adapt," SIGNAL Magazine, Jan. 2012, 3 pages.

\* cited by examiner

PROTECTED OVERLAY OF ASSIGNED FREQUENCY CHANNELS

CLAIM OF PRIORITY

The present application claims priority from U.S. Provisional Patent Application No. 62/286,154, entitled "Protected Overlay of Assigned Frequency Channels," by Hreha, et al., filed Jan. 22, 2016, incorporated by reference herein in its entirety.

BACKGROUND OF THE INVENTION

The present disclosure relates to technology for wireless communication systems.

Wireless communication systems typically include a communication platform such as a dedicated terrestrial antenna, airborne platform, or communications spacecraft such as a satellite. Such platforms typically operate within regulations that allocate at least one operating frequency bandwidth for a particular communications service and specify, among other things, a maximum signal power spectral density (PSD) of communications signals radiated to the ground, etc. A growing market exists for provision of high data rate communication services to individual consumers and small businesses which may be underserved by or unable to afford conventional terrestrial services and require protected communications capable of mitigating the effects of intentional and unintentional interference. To advantageously provide high data rate communication services to such users, a communications platform must (1) provide a high PSD so as to enable the use of low cost user terminals, and (2) efficiently use the licensed bandwidth so as to maximize the communications throughput and protection level for a particular licensed bandwidth.

Typically, frequency reuse plans are developed prior to design and deployment of a communications system in order to service the projected needs of the system. In many cases, particularly in the case of space-based communications, these frequency reuse plans may be formed into the hardware of the device such that post deployment alterations are not feasible. Despite the best planning techniques, many communications platforms have excess capacity after deployment.

DETAILED DESCRIPTION

The disclosed technology is directed to protected communications in wireless communications systems. Wireless communication systems are disclosed that provide for determination of and discrimination between different categories of users that operate in an allocated frequency spectrum. A communication platform such as a spacecraft, air born platform, or terrestrial line of site wireless platform is provided with a digital channelization engine and adaptive beamformer. The platform digitizes the full spectrum allocation for the digital channelization engine. The channelization engine determines a particular user or user group associated with received signal. In this manner, the communication platform can apply different processing based on the user or group associated with a signal.

In one example, the communication platform receives uplink signals associated with a first user group and a second user group. The platform dynamically generates one or more spot beams for the first user group and the second group. The platform discriminates the uplink signals to apply frequency hopping for the downlink frequency channel assignments to the second user group while the downlink frequency channel assignments for the first user group remain fixed.

The first user group may represent a primary user category in one example. When the primary user category does not fully utilize the allocated spectrum, the available frequency channel assignments may be allocated to secondary user categories. The communication platform may apply frequency hopping to the second and optionally additional user categories while the primary user category does not undergo frequency hopping.

In one embodiment, the first user group remains at fixed frequency channel assignments while the second user group has frequency channel assignments that are hopped by the platform. In another embodiment, the first user group and the second user group may both hop using orthogonal patterns from each other. In another example, there may be additional user groups in addition to the second user group. For example, the users in the first user group may have fixed frequency channel assignments. A second user group and a third user group may undergo frequency hopping by the platform. The platform can hop the second user group and the third user group on orthogonal patterns that avoid each other and the first user group.

The communication platform applies dynamic beamforming to the signals of one or more of the user groups in one embodiment. For example, the communication platform can utilize an adaptive beamformer that uses dynamic beamforming for the signals associated with a second user group while using fixed beamforming for the signals associated with a first user group. In one embodiment, the communication platform generates a first user beam including downlink signals for a first user group. The user beam can include an allocated frequency spectrum for which the first user group is using less than all of the available frequency channels. The communication platform can generate a second user beam that at least partially overlays the geographic coverage area of the first user beam. The communication platform uses dynamic beamforming to form the second user beam. In one example, the platform generates the overlapping second beam dynamically to include nulls that mitigate the effects of interference. In one embodiment, the platform generates multiple spot beams for the first category of users and one or more overlaying spot beams for the second category of users. Moreover, the platform may generate dynamic beamforms for more than one category of users.

Figure 1:
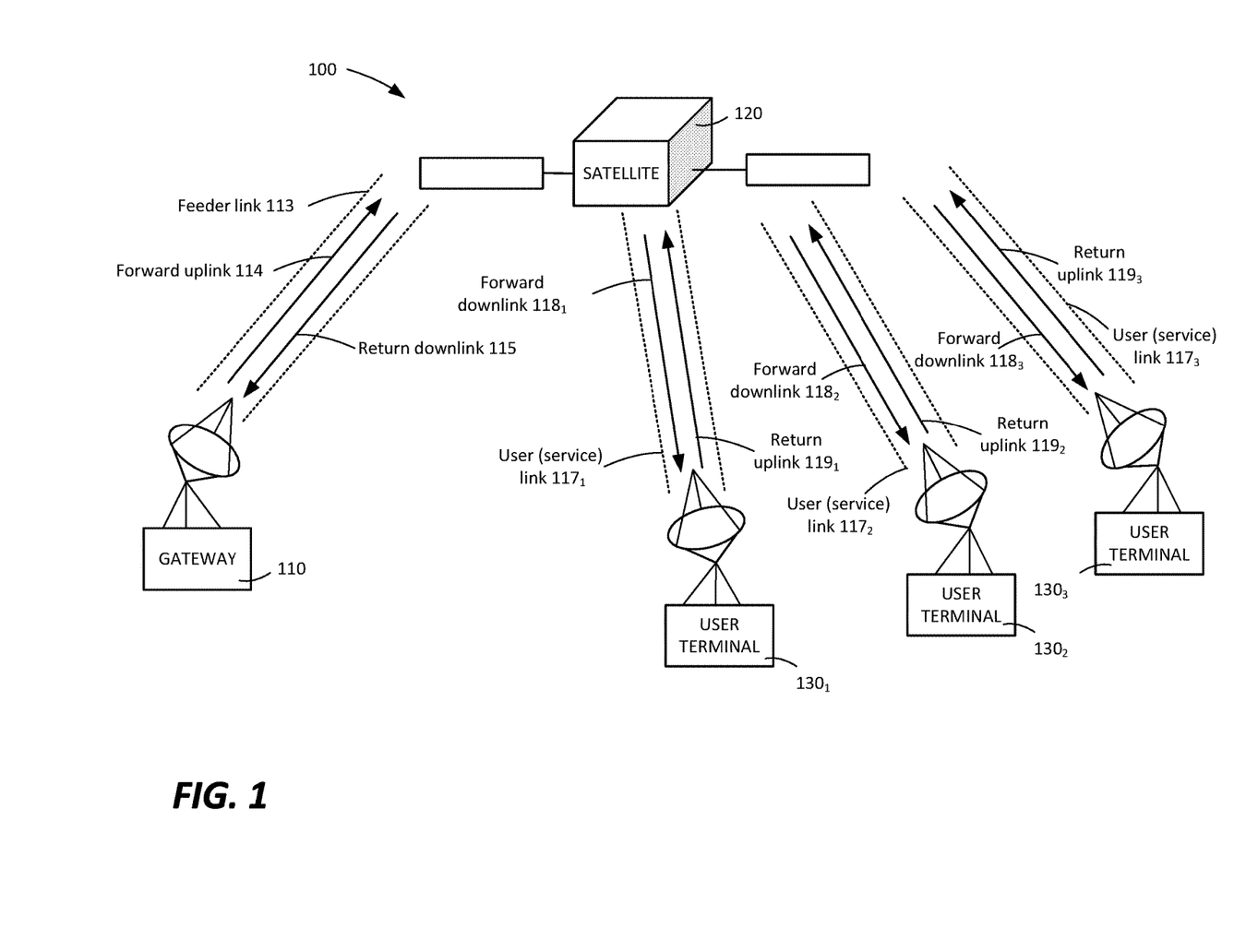
FIG. 1 is a block diagram describing a wireless communications system in which embodiments of the disclosed technology may be practiced.

FIG. 1 depicts a simplified diagram of a wireless communications environment in which embodiments of the presently disclosed technology may be practiced. In the example of FIG. 1, a communications platform according to one embodiment includes a satellite 120 forming part of a wireless communications network 100. Satellite 120 may be located, for example, at a geostationary or non-geostationary orbital location. Satellite 120 may be communicatively coupled, via at least one feeder link antenna, to at least one gateway 110 and, via at least one user link antenna to a plurality of user terminals 130. The term user terminals 130 may be used to refer to a single user terminal or user terminals such as user terminals $130_1$, $130_2$, $130_3$ collectively. A user terminal is adapted for communication with a wireless communication platform such as satellite 120. User terminals may include fixed and mobile user terminals including, but not limited to, a cellular telephone, wireless handset, a wireless modem, a data transceiver, a paging or position determination receive, or mobile radio-telephone. A user terminal may be hand-held, portable (including vehicle-mounted installations for cars, trucks, boats, trains, planes, etc.) or fixed as desired. A user terminal may be referred to as a wireless communication device, a mobile station, a mobile wireless unit, a user, or a subscriber.

The at least one gateway 110 may be coupled to one or more networks such as, for example, the Internet, terrestrial public switched telephone network, mobile telephone network, etc. A gateway 110 and the satellite 110 communicate over a feeder link 113, which has both a forward uplink 114 and a return downlink 115. Feeder link 113 may operate for example, in an assigned or allocated frequency band (e.g, between 17 and 80 GHz). Although a single gateway is shown, typical implementations will include many gateways, such as five, ten, or more. Each gateway may utilize its own gateway beam, although more than one gateway can be positioned within a beam.

User terminals 130 and the satellite 120 communicate over user links 117 that have both a forward downlink 118 and a return uplink 119. Three user terminals with three user links $117_1$-$117_3$ are shown by way of example. Typical implementations will include many user terminals. Moreover, many user terminals may be located within the geographic coverage area of a single user beam. Many user beams may be included in various implementations. For example, fifty, sixty or more (or fewer) user beams may be used to generate a service region. User link 117 may operate in an assigned frequency band that is different than or the same as the frequency band assigned to feeder link 113. For example, the user links may operate in the same assigned frequency band as the gateway, such as where the gateway is located in a coverage area spatially separated from the coverage areas of the user beam or user beams for which the frequency is re-used. In other examples, one or more gateways may be located in the same coverage area as a user beam coverage area. The gateway may share the available frequency spectrum.

A spacecraft antenna subsystem may provide an antenna beam pattern wherein an entire service region is covered using the available bandwidth at a single time. In another example, however, multiple satellite antenna beams (or cells) are provided, each of which can serve a substantially distinct area within an overall service region. In one embodiment, satellite 120 is a multi-beam spacecraft having an antenna subsystem for providing a grid of antenna spot beams. The shape of the grid in turn defines a service region. The grid of individual spot beams (user beams) divides an overall service region into a number of smaller cells. For example, U.S. patent application Ser. No. 11/467,490 describes a pattern of 135 spot beams covering the continental United States (CONUS), Hawaii, Alaska, and Puerto Rico. It is noted that a service region may be defined in any manner to cover any desired geographic location. In one embodiment, the antenna subsystem includes a phased array antenna, a direct radiating antenna, or a multi-feed fed reflector.

Dividing the overall service region into a plurality of smaller cells permits frequency reuse, thereby substantially increasing the bandwidth utilization efficiency. In some examples of frequency reuse, a total bandwidth allocated to the downlink is divided into separate non-overlapping blocks for the forward downlink 118 and the return downlink 115. Similarly, the total bandwidth allocated to the uplink is divided into separate non-overlapping blocks for the forward uplink 114 and the return uplink 119.

In other examples, some or all of the allocated bandwidth is reused by the gateway(s) 110, thereby providing for simultaneous operation of at least a portion of the feeder link 113 and a portion of the user link 117 at common frequencies. More specifically, forward uplink 114 and return uplink 119 may reuse the same frequency and forward downlink 118 and return downlink 115 may reuse the same frequency. Simultaneous operation of the feeder link 113 and the user link 117 at common frequencies means that the gateway(s) 110 may reuse any part of the total bandwidth allocated to the user antenna beams. This may be accomplished in various ways.

The architecture of FIG. 1 is provided by way of example and not limitation. Embodiments of the disclosed technology may be practiced using numerous types of implementations. For example, some communications systems may only include a single terminal type, such as user terminals that communicate with one another. In such systems, gateways may not be used.

Figure 2:
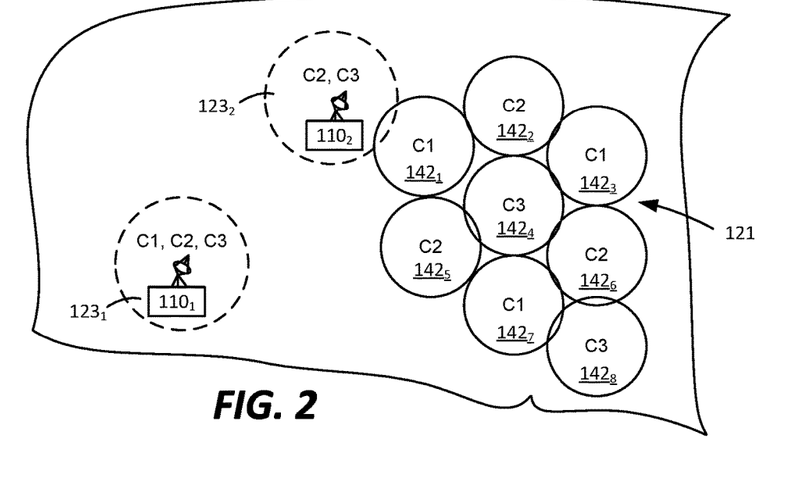
FIG. 2 is a map describing the placement of gateways and user beams and an example of a frequency reuse plan.

FIG. 2 depicts a specific example of an antenna coverage pattern that provides for partial spatial separation between the gateway(s) 110 and a service region 121 to enable non-interfering use of the same frequency by the gateway(s) 110 and user terminals 130. FIG. 2 is provided by way of example only, as it will be apparent that any number and type of coverage patterns may be used in accordance with embodiments of the disclosed technology. As shown in FIG. 2, the service region 121 is defined as the footprint made by a plurality of user beams 142. The term user beam 142 may be used to refer to a single user beam or multiple user beams such as $142_1$-$142_8$ collectively. These user beams correspond to the geographic coverage area serviced by a particular user link 113. A user terminal 130 located within the footprint of any of eight user beams 142 may be communicatively coupled over a user link 117 to spacecraft 120. Each gateway 110 is located in a gateway beam 123. Spacecraft 120 may be communicatively coupled over feeder link 113 to any one of the gateways 110. Each gateway 110 may also be proximate to, and communicatively coupled with, a high speed Internet backbone access point. Gateway beam $123_1$ is substantially spatially isolated from the service region 121. Because of this spatial isolation, the user link 117 is operable at the same frequency(ies) as the feeder link 113. Moreover, the frequency band common to both the feeder link 113 and the user link 117 may encompass substantially all of the allocated bandwidth.

Figure 3:
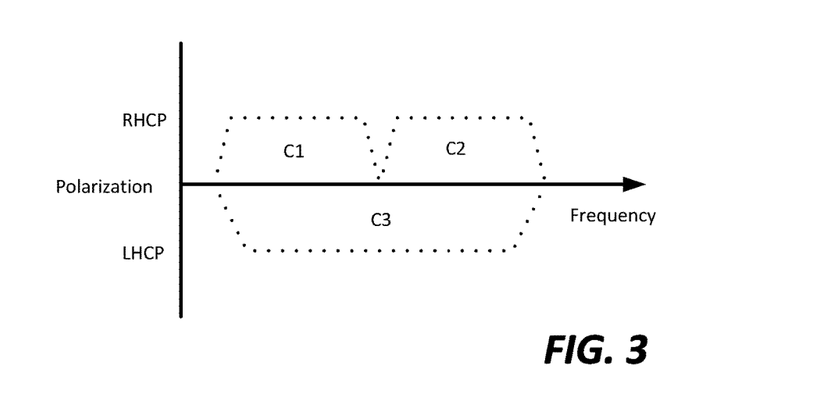
FIG. 3 is a diagram describing an example of unique combinations of frequency and polarization that may be used in a frequency reuse plan.

Frequency reuse by two or more user beams 142 may be used. For example, any two user beams may employ the same frequency without regard to antenna polarization where the two user beams are spatially isolated (i.e., no adjacent or overlapping beam patterns so adequate RF signal isolation between beams is provided). Adjacent user beams may use a common frequency where each adjacent user beam operates at a different antenna polarization. Frequency re-use within a plurality of user beams 142 may also use, for example, what is referred to as a "color" re-use plan. As illustrated in FIG. 3, in a color re-use plan, each color represents a unique combination of frequency band and antenna polarization. In this example, color C1 represents a first sub-band of an allocated frequency band with a right-hand circular polarization (RHCP). Color C2 represents a second sub-band of the allocated frequency band with RHCP. Color C3 represents the entire allocated frequency band with a left-hand circular polarization (LHCP). The colors may include other allocations of the frequency band and polarization. One assignment of colors to user beams 142 provides that two adjacent user beams do not share both a common frequency and a common polarization for use at a given time. In the disclosed example, adjacent beams do not share the same color such that the unique combinations of frequency and polarization are not shared between beams. In FIG. 2, an example is shown where gateway beam $123_1$ is spatially separated from each of the user beams as well as gateway beam $123_2$. Accordingly, gateway $110_1$ may operate in beam $123_1$ at every color C1, C2, and C3 without interfering with communication in the other user beams and gateway beam. Gateway beam $123_2$, however, is located adjacent to user beam $142_1$. As such, the system does not assign the same combination of frequency and polarization to gateway beam $123_2$ and user beam $142_1$. Accordingly, gateway beam is only assigned colors C2 and C3 since user beam $142_1$ is assigned color C1.

A three color re-use plan is provided as an example only as any number of colors may be used in a given frequency re-use plan. For example, four color re-use plans are common whereby a first color represents a first frequency sub-band and first polarization, a second color represents a second frequency sub-band and the first polarization, and a third color represents the first frequency sub-band at a second polarization and a fourth color represents the second frequency band at the second polarization. For a further discussion of frequency re-use, refer to U.S. Pat. No. 7,793,070, entitled "Multi-Beam Satellite Network to Maximize Bandwidth Utilization." It is noted that the service region and antenna pattern of FIG. 2 is a simplified example. The disclosed concepts may be practiced in any geographic service region. Numerous examples and implementations may be practiced within the scope of the disclosure.

It is noted that the broadband communications system described herein is provided by way of example and not limitation. Embodiments of the present disclosure may be practiced in other satellite-based systems such as mobile satellite communications, fixed-service satellite communications, etc. Moreover, embodiments of the disclosed technology may be practiced in non-satellite based systems such as air borne platforms or terrestrial line of site wireless systems.

In many satellite systems, a number of channels within an allocated bandwidth or frequency spectrum may not be used for some period of time. For example, a broadband or mobile communications satellite may be planned and designed with a channel capacity for an estimated number of users in a geographic coverage area associated with a particular spot beam from the frequency plan. The actual number of subscribers may be less than the capacity of the frequency channel assignments for these primary users of the satellite. In accordance with an embodiment, the unused frequency channel assignments for a satellite system may be re-allocated to a secondary category users for use. Moreover, this second category of user may utilize the non-allocated frequency spectrum using some or all the same satellite payload as the primary user category.

The satellite implements digital channelization that permits discrimination between users in a common frequency spectrum aboard the satellite. In this manner, the satellite can discriminate signals for a first category of users from signals for a second category of users. Accordingly, the satellite may permit the second category of users to access the non-assigned frequency channels that are not being used by the primary user category. Additionally, the satellite provides digital signal processing to provide protected communications for one or more categories of users. For example, the satellite may implement frequency hopping for users in the second category whereby those users frequency hop around the frequency channel assignments allocated to the primary user category. Moreover, the system may permit the second category of users to frequency hop on to the same frequency channel assignment of the first category of users. With knowledge of the characteristics of the frequency channel assignment of a first user, the system can allow a second user to use the same frequency channel assignment whereby the first and second user channel assignments satisfy the performance characteristics of a carrier in carrier approach.

These system may thus be designed to leverage existing capacity, for example aboard a commercial satellite, to allow a different user to access the same wireless asset for operation in the presence of hostile interference such as jamming signals. Frequency hopping may employ spread-spectrum (SS) techniques and/or sophisticated multiplexing techniques to protect the signals from jamming, as well as to prevent exploitation of such signals by enemy forces or other entity attempting to disrupt the signals or use the spectrum. Moreover, these techniques may be applied to allow such use to be adaptive to utilize only that portion of a satellite's allocated spectrum that is not being used by its primary user group.

Figure 4A:
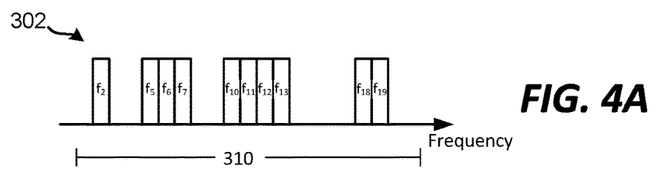
FIG. 4A is a diagram describing the frequency channel assignments of a first user group within an allocated frequency spectrum.
Figure 4B:
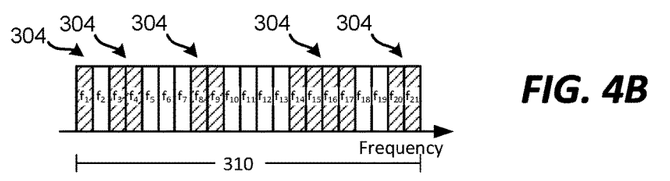
FIG. 4B is a diagram describing the utilization of non-assigned frequency channels by an additional user group according to one embodiment.

FIGS. 4A-4B depict an example of utilizing the frequency allocation for a wireless communication platform to service a first user group and a second user group in sub-bands of a common frequency spectrum allocation. An allocated frequency band or spectrum (e.g., 2 GHz) may have a number of available frequency channel assignments. In this simplified example, there are twenty-one available frequency channels within an allocated frequency spectrum 310. A first user group 302 utilizes ten of the twenty-one available frequency channels—channels f2, f5-f7, f10-f13, and f18-19. For example, FIG. 4A may represent a scenario in which a commercial provider of broadband or mobile communications has ten subscribers in a given coverage area for which there are twenty-one available frequency channel assignments for users. This arrangement leaves frequency channels f1, f3-f4, f8-19, f14-f17, and f21 unassigned or available for use.

FIG. 4B depicts the same frequency spectrum 310 with the addition of a second user group 304 that utilizes the available frequency channels. This second user group is allocated frequencies f1, f3-f4, f8-19, f14-f17 by the system. Moreover, the satellite digitizes the full frequency spectrum 310 such that it can discriminate between signals associated with the first user group and signals associated with the second user group. Accordingly, the satellite may perform ancillary or additional functions for the different categories of users. In this manner, the satellite may frequency hop the channel assignments for users in the second user group using the available frequency channels such that the users in the second user group do not use the frequency channels assigned to the first user group.

Figure 4C:
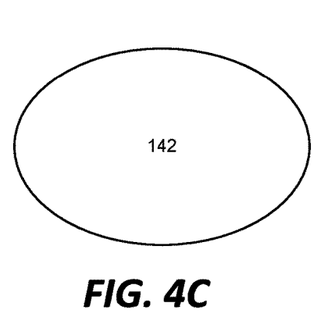
FIG. 4C is a diagram of a single spot beam in which embodiments of the disclosed technology may be practiced.

It is noted that the first group of users and the second group of users may utilize one or more spot beams, independently or together. For example, FIG. 4C depicts a single spot beam such as a single user beam. In one embodiment, users in a first user group may be assigned to frequency channels in an allocated frequency spectrum associated with a single spot beam. The non-allocated frequency channels within this spectrum may be used by a second (or additional) category of users for frequency hopping as described. In this example, the user links for the first user group may be in the same spot beam as the user links for the second user group.

Figure 4D:
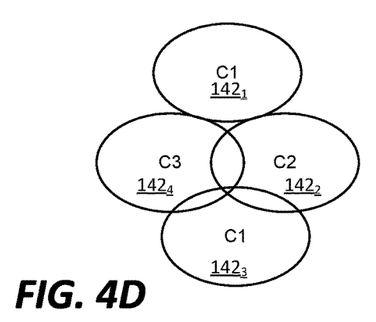
FIG. 4D is a diagram of a multiple spot beams in which embodiments of the disclosed technology may be practiced.

FIG. 4D depicts four spot beams associated with four geographic coverage areas. In one embodiment, users in a first user group may be assigned to frequency channels in an allocated frequency spectrum associated with multiple spot beams. In FIG. 4D for example, four spot beams are depicted, with each spot beam associated with one of three colors. The first user group may include users that are assigned frequency channels within an allocated spectrum associated with any of the three colors and four spot beams. The second user group may utilize the frequency channels from any of the four spot beams that are not used by the first user group. In this manner, a particular user may frequency hop using any available frequency in its current geographic coverage area. Similar to FIG. 4C, the second (or additional) category of users utilize the same spot beams as the first category of users.

In one example, the allocated frequency spectrum may be in a single spot beam, or multiple spot beams, including two adjacent spot beams. Orthogonal hopping between users in adjacent spot beams allows both users to spread across the same available spectrum.

Figure 5:
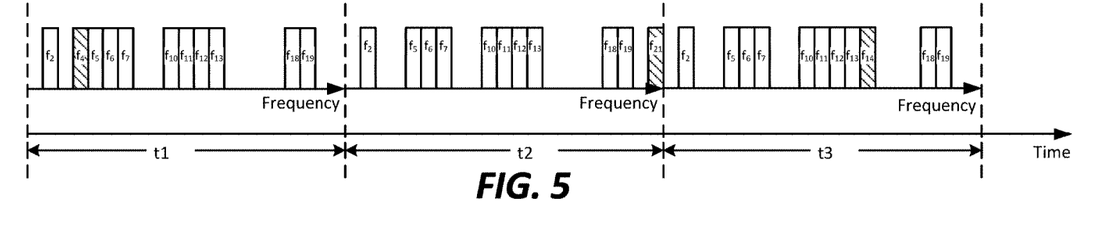
FIG. 5 is a diagram describing frequency hopped channel assignments for a second user around the frequency channel assignments of a first user group.

FIG. 5 depicts one example of the division of an allocated frequency spectrum between user groups that permits frequency hopping of users from a second user group around the frequency channel assignments for a first user group. Time is represented horizontally along the x-axis. The frequency channel assignments for the allocated spectrum 310 are depicted at three separate times or time periods. Each time period may represent a different clock cycle in one example.

At a first time t1, frequency channels f2, f5-f7, f10-f13, and f18-19 are assigned to users in a first user group, represented by the white boxes. For example, ten individual users or user terminals from the first user group may be assigned these frequency channels. Also at time t1, a single user or user terminal from a second user group is assigned frequency channel f4 which is outside of any of the frequency channel assignments for users in the first group. This user from the second group is represented by diagonal-hatching in the box.

At a second time t2, frequency channels f2, f5-f7, f10-f13, and f18-19 remain allocated to users in the first user group, again represented by the white boxes. At time t2, the single user from the second category is assigned frequency channel f21. The user from the second user group has been frequency hopped from the frequency channel assignment f4 during the first time period to the frequency channel assignment f21 during the second time period, while the users within the first group remain within the fixed channel assignments.

At a third time t3, frequency channels f2, f5-f7, f10-f13, and f18-19 remain allocated to users in the first user group. At time t3, the single user from the second user group is assigned frequency channel f14. The user from the second user group has been frequency hopped from the frequency channel assignment f21 during the second time period to the frequency channel assignment f14 during the third time period, while the users within the first category remain within the fixed channel assignments.

As demonstrated in FIG. 5, the satellite is able to discriminate among various users and thereby frequency hop a second group of users within frequency channels not occupied by a first group of users in the same frequency spectrum. In this manner, a user from the second group is frequency hopped using the available frequency spectrum not occupied by the first user group.

Figure 6:
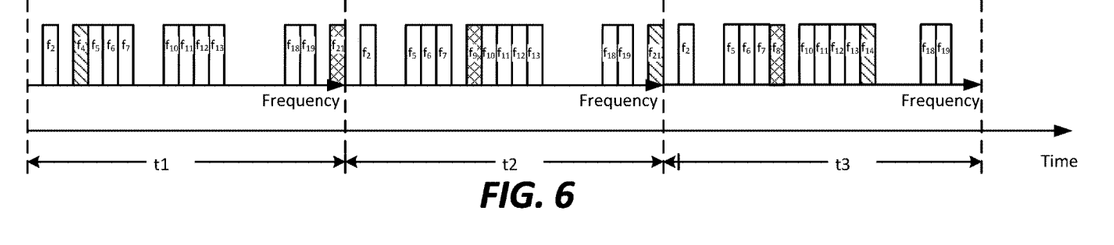
FIG. 6 is a diagram describing frequency hopped channel assignments for multiple users around the frequency channel assignments of a first user group.

In FIG. 6, a similar scenario is described with a two users utilizing the available frequency spectrum not allocated to the first user group. The two users may be from the same user group or different user groups. In this example, the satellite frequency hops both users or terminals around the frequency channel assignments of the first user group. At times t1, t2, and t3, frequency channels f2, f5-f7, f10-f13, and f18-f19 remain allocated to users in the first user group. At time t1, a first user represented by the diagonal-hatching is allocated frequency channel f21 and a second user represented by the cross-hatching is allocated frequency channel f9. The first user and the second user may both be from the same user group or different user groups. At time t2, the first user frequency hops to frequency channel f4 and the second user frequency hops to channel f21. At time t3, each user in the first user group remains within its assignment at channels f2, f5-f7, f10-f13, and f18-f19. The first user hops to frequency channel f14 and the second user hops to frequency channel f8. Both users remain outside of the frequency channels allocated to the first user group during each frequency hop. Each user in the second category may be associated with a specific dehopping key that permits the satellite to dehop each user to the correct frequency for processing.

There may be as many additional users added to a system as there are available frequency channels. For example, in FIG. 4A, there may be up to eleven additional users assigned to the available frequency channels. Each additional user frequency hops in an orthogonal pattern to one another so that no two users are assigned the same frequency at the same time. Additionally, there may any number of user groups or categories of users. Continuing with the example from FIG. 4A, the eleven available frequency channels may be allocated to up to eleven different categories of users. In this manner, each user form the eleven categories frequency hops orthogonally to the other users using the portion of the frequency spectrum not used by the first user category. Each user grouping can hop using an orthogonal pattern from each other user category that is frequency-hopped. Moreover, it is noted that the first user category may frequency hop as well—also on an orthogonal pattern to the other user groups. The uplink signals for user groups may originate from a single gateway, or other terminal device, or multiple gateways. For example, uplink signals for a first user group may be transmitted by a first gateway or terminal while uplink signals for a second user group may be transmitted by a second gateway or terminal.

Figure 7A:
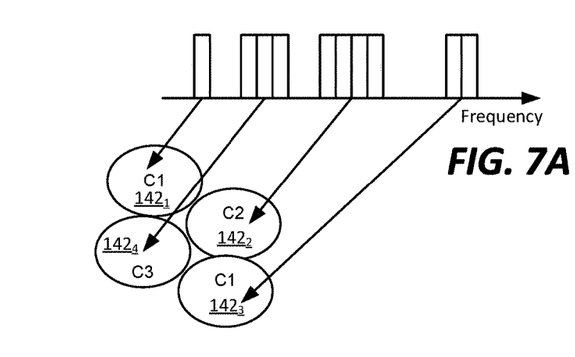
FIGS. 7A-7C are diagrams depicting frequency channel assignments and spot beam formation according to one embodiment.
Figure 7B:
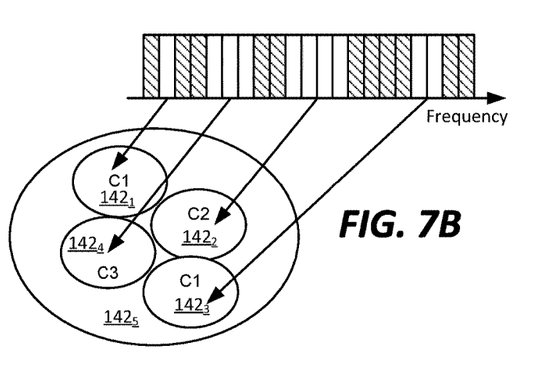
Figure 7C:
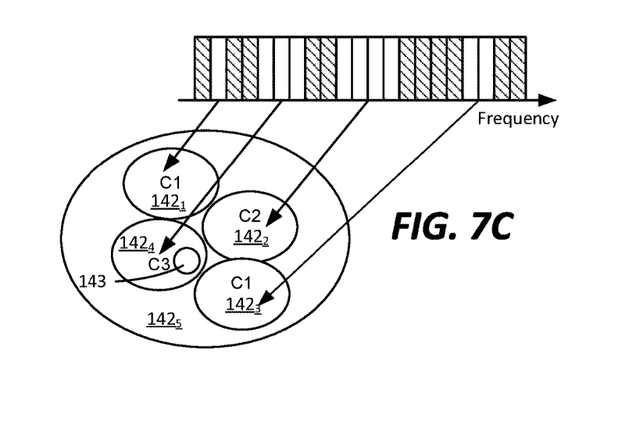

FIGS. 7A-7C depict an example where beams are formed for individual user categories and dynamic beam formation is utilized. In FIG. 7A, four user spot beams are depicted. Again, the four spot beams are allocated frequency spectrum from one of three colors representing unique combinations of frequency and polarization. Other frequency reuse schemes may be used. In FIG. 7A, the four spot beams may be created to service the users based on geographic location and user density requirements in one example.

In FIG. 7B, a fifth spot beam $142_5$ is depicted. In this example, the fifth spot beam is formed for the second category of users. The geographic coverage area of the fifth spot beam overlays the geographic coverage area of the four smaller spot beams. In other examples, the fifth spot beam may only partially overlay one or more of the other spot beams. As shown in FIG. 7B, the second user group is assigned to a unique spot beam that is different from the spot beam of the first user group. As such, the second user group may frequency hop using any of the available frequency channels from the four smaller spot beams that it geographically overlaps. Moreover, the second user group may frequency hop using a beam that is adaptively formed by the satellite and which is separately formed from the beams associated with the first user category. In this manner, the satellite may create beams for individual channels.

Although not show in FIG. 7B, the satellite may create additional spot beams for other categories of users. For example, a third user group could have a beam created for it that overlaps the spot beam for the second user group to permit the third user category to also use the frequency channels from the four underlying spot beams. The third user group may frequency hop in an orthogonal pattern to that of the second user group, each using the available frequency channels not occupied by the first user group in a manner that avoids any user occupying the same frequency channel at a given time.

FIG. 7C describes adaptive beamforming by the satellite for the second user group in one embodiment. In this example, it is shown that a null can be created in the spot beam corresponding to a particular portion of the fifth geographic coverage area. For example, the satellite may adaptively form the beam for the second user group dynamically to create a null 143 to mitigate the effects of interference. Additionally, the satellite may use adaptive beamforming so that the beams for the other geographic coverage areas may be formed dynamically to create nulls.

Figure 8A:
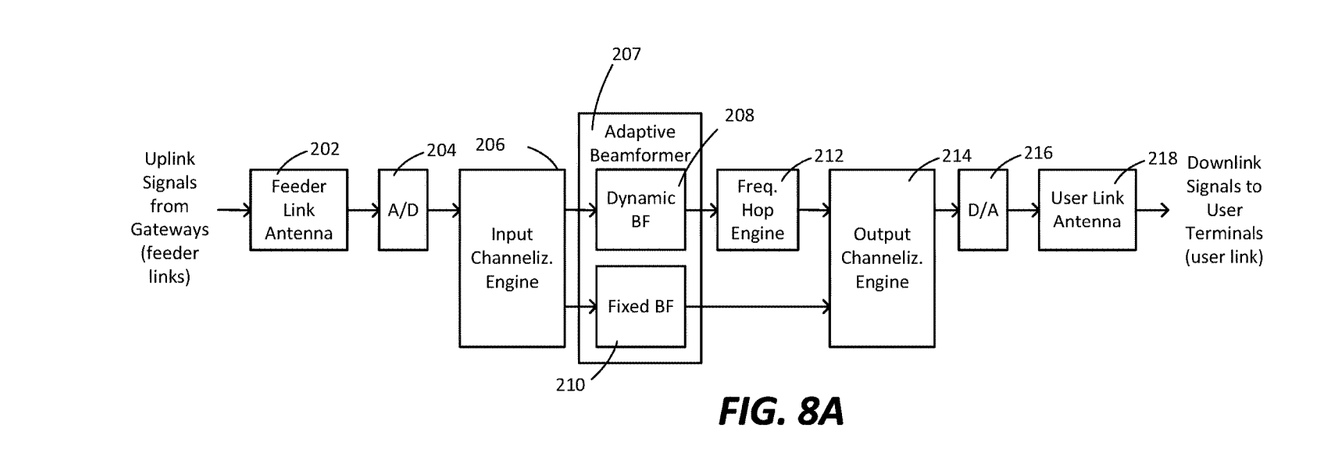
FIGS. 8A-8B are block diagrams describing the payload architecture of a communications platform according to one embodiment.
Figure 8B:
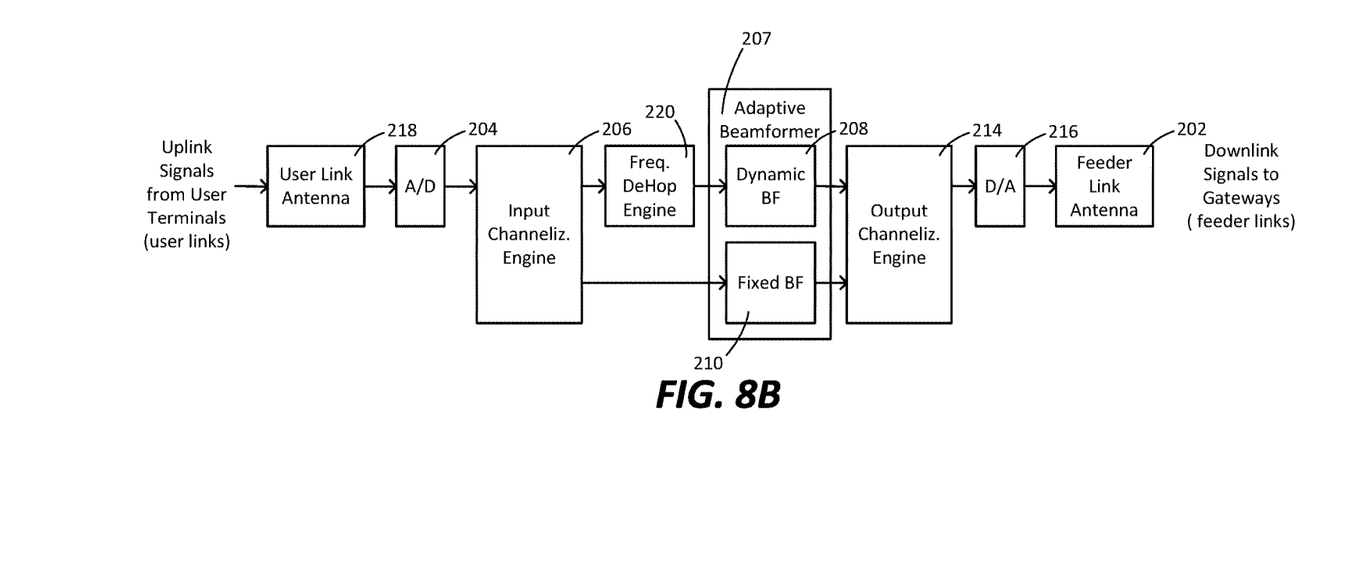

FIGS. 8A-8B are block diagrams describing a portion of a payload subsystem for satellite 110 in one embodiment. Referring first to FIG. 8A, there is depicted a block diagram of the forward path at the satellite from a gateway to a user terminal. A plurality of uplink signals are received at a feeder link antenna 202 from a plurality of gateways via feeder links 113. The uplink signals that are received include uplink signals for two or more user groups. For example, the first user group may be a set of commercial users, such as mobile telephone subscribers, broadband internet subscribers, satellite television subscribers, etc. The second user group may be a second set of commercial users having increased security needs for their communications or may be a government or military user. The uplink signals may include communications for the first user group and the second user group that both originate from the same gateway in one example. In another example, the signals for each user group originate from separate gateways. Moreover, although FIGS. 8A-8B describe an example including gateways, other examples may not include gateways, or may include a centralized terminal (e.g., master terminal). In such implementations, the forward path may include an uplink signal from one user terminal or a centralized terminal and a downlink signal to a second user terminal, for example.

Each uplink signal undergoes analog to digital conversion by one or more analog-to-digital converters (A/D) 204. For example, each gateway uplink may include a dedicated A/D 204. Each A/D digitizes the full spectrum received from the gateway. For example, each A/D may digitize 2 GHz of Ku fixed satellite uplink spectrum from 12.75 to 14.8 GHz. Although not shown, each signal may undergo filtering to isolate a subband of frequencies prior to digital conversion. The filtered signal may then be amplified and downconverted to an intermediate frequency for further digital processing.

After being digitized, each uplink signal is provided to a channelization engine 206. In one example, the channelization engine 206 is a channelizer. The channelization engine divides the bandwidth of each uplink signal into independently routable subchannels that permit connectivity between any uplink signal or feeder link and any downlink signal or user link. The channelizer can generate a digitized bitstream from the analog signals for processing aboard the satellite. This digitized bitstream may represent slices or packets of the incoming signal which may then be routed independently by the channelization engine.

Additionally, the channelization engine permits discrimination or determination of the origin of each uplink signal. The channelization engine can determine the user associated with each independent uplink signal once it has been digitized and channelized. In another example, the channelization engine determines the group or category of user associated with the uplink signal. The channelization engine routes the channelized uplink signals to an adaptive beamformer 207.

The input channels from the second user group are routed to a dynamic beamformer 208 and the input channels from the first user group are routed to a fixed beamformer 210.

Dynamic beamformer 208 adds spatial features to beams to permit differentiation of users on the ground. For example, beamformer 208 may create nulls in the beams of the second category of users at specific locations to eliminate interference. The dynamic beamformer 208 permits individual channel sub-gain control of the beams for the second user group. The dynamic beamformer 208 includes adaptive filters in one example that permit adaptively changing the bandwidth of individual beams as well as the routing of signals between beams. Fixed beamformer 210 can generate a fixed beam according to predetermined requirements for the first user group. In another example, the uplink signals from the first user group can also undergo dynamic beamforming.

In one embodiment, a single beam or multiple beams may include signals for the first user group and the second user group. In another embodiment, a first beam or a first set of beams includes signals for the first category of users and a second beam or second set of beams includes signals for the second user group.

The channelized digital signals are routed to frequency hop engine (FHE) 212. The frequency hop engine 212 hops or dynamically allocates the channels assigned to the second user group such that their assigned channels continually move between channels not assigned to the first user group. The first user group has fixed, either temporary or permanent, frequency channel assignments. The first user group occupies a first set of frequency channels over multiple clock cycles. FHE 212 continuously changes the frequency assignment to users in the second user group such that their frequency assignments hop between frequencies in a second set of frequency channels outside of the first set but within the allocated frequency spectrum.

In one embodiment, the users in the first user group may be assigned frequency channels such that the channel assignments for each user hops within a first set of frequency channels in the allocated frequency spectrum while the users in the second user group may be assigned frequency channels such that the channel assignments for each user hops within a second set of frequency channels in the allocated frequency spectrum.

In one embodiment, the gateways associated with the second category of users transmit a frequency hopped-modulated signal to the satellite. The received signal may undergo amplification, down-conversion, and de-spreading. The signal may undergo filtering to remove noise and other unwanted signals.

After the frequency channel assignment for each user in the second category has been hopped to its new frequency channel assignment, the dynamic beamform signal is routed to the output channelization engine 214. Engine 214 channelizes the signals from the dynamic beamformer to generate channelized signals for each spot beam. The channelized spot beam signals, in this case for the user links, are routed to a set of digital to analog converters (D/A) 216. In one example, there is a single D/A converter for each spot beam signal. In another example, multiple D/A converters may be used for each spot beam signal. The D/A converter(s) convert the digital spot beam signals to analog signals. The D/A converter(s) convert the full spectrum of the allocated frequency for spot beams. For example, the D/A's may convert 2 GHz of Ku fixed satellite down spectrum from 10.7 to 12.75 GHz. The analog signals from the D/A converter(s) are routed to a user link antenna 218. Antenna 218 includes multiple feeds, using a direct radiating or multi-feed fed reflector for example. Antenna 218 may include a set of antennas configured to generate the set of user spot beams.

The channelized signals for the first category of users are discriminated from the second category of users on-board the satellite. These signals are routed to fixed beamformer 210 and then directly to channelization engine 214. The output channelization engine 214 then uses the signals to form channelized signals for each spot beam. The channelization engine may combine signals from the frequency hop engine and fixed beamformer, for example, to form a single beam having the second category of users overlaid with the first category of users. In this manner, the second user group has frequency channel assignments that are frequency-hopped aboard the satellite before transmission while the first user group has fixed frequency channel assignments that do not undergo hopping by the satellite. The first user group may occupy a first set of frequency channel assignments within the allocated frequency spectrum. The assignments for individual users in the first set of frequency channel assignments are static or fixed over multiple clock signals. The assignments for users in the second set of frequency channel assignments hop around on the frequency channel assignments not occupied by the first user group. In another example, the first user group may frequency hop within the first set of frequency channel assignments and the second user group may frequency hop within the second set of frequency channel assignments.

Although not shown, the uplink signals from the gateways may be dehopped in one example. Signals for either user category may be dehopped. The dehopped signals may be provided through digital beamformer 208 for subsequent hopping before transmission to a user terminal or through fixed beamformer 210 where they are not hopped before transmission.

Referring to FIG. 8B, there is depicted a block diagram of the return path at the satellite from the user terminals to the gateways. A plurality of uplink signals are received at user link antenna 218 from the user terminals. Each uplink signal undergoes analog to digital conversion by A/D(s) 204. After being digitized, each uplink signal is provided to input channelization engine 206. The input channelization engine routes the uplink signals from the second category of users to frequency dehop engine 220 and routes the uplink signals from the first category of users to fixed beamformer 210. The frequency dehop engine 220 dehops each uplink signal to a fixed frequency using a dehopping key that is specific for each user. After dehopping, the dynamic beamform signal is routed to dynamic beamformer 208 and then the output channelization engine 214. Engine 214 channelizes the signals from the dynamic beamformer to generate channelized signals for each spot beam. The channelized spot beam signals, in this case for the downlink portion of the gateway feeder links, are routed to a set of digital to analog converters (D/A) 216. The analog signals from the D/A converter(s) are routed to the feeder link antenna 202.

In FIGS. 8A-8B, an example is depicted where the feeder links are not frequency hopped and the user links are frequency hopped for the second user group. Such implementations may be useful where the feeder links are positioned in an area free from signal jamming, interference, or interception. In another example, the feeder link signals may undergo frequency hopping as well. In FIG. 8A, the signal from the gateways may undergo frequency dehopping before frequency hopping (212) in such a case. After dehopping according to the gateway key, the signal can be frequency hopped using the user terminal hopping key. Similarly in FIG. 8B, the signal from the user terminals can undergo frequency hopping after frequency dehopping (220). After dehopping according to the user terminal key, the signal can be frequency hopped using the gateway key. In one embodiment, a user signal such as an uplink signal from a first user terminal can undergo dynamic beamforming and dehopping by the communications platform. Then, dynamic beamforming occurs on the dehopped signal and frequency hopping is performed. The uplink user signal is then provided as an output signal (e.g., as a downlink signal).

Figure 9:
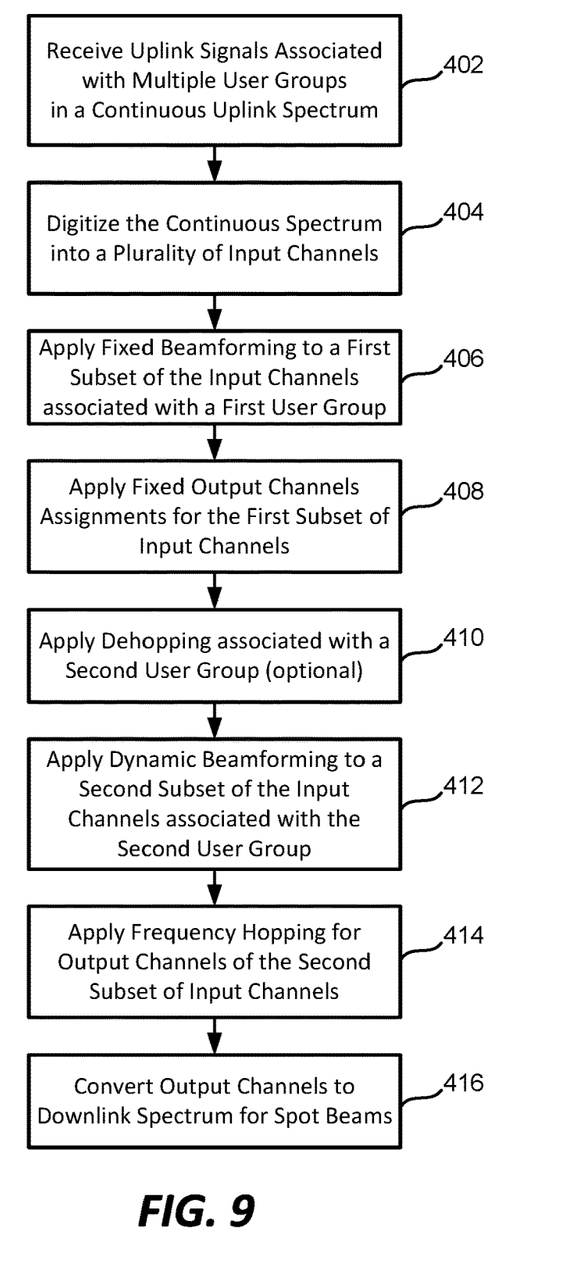
FIG. 9 is a flowchart describing a process of wireless communication including dynamic and fixed channel assignments within a continuous frequency spectrum according to one embodiment.

FIG. 9 is a flowchart describing a process performed by a wireless communications platform in one example to provide fixed channel assignments within a continuous spectrum allocation to a first category of users while providing dynamic channel assignments within the continuous spectrum allocation to a second category of users.

At step 402, uplink signals are received at a communications platform such as a satellite. The uplink signals are received in a continuous uplink spectrum and are associated with multiple user groups. The uplink signals may be received from gateways, terminals, or a central controller.

The uplink signals may be received from one or more of these devices. At step 404, the platform digitizes the uplink spectrum into a plurality of input channels. The platform discriminates input channels associated with different user groups. At step 406, the platform applies fixed beamforming to a first subset of the input channels that are associated with a first user group. The platform applies fixed output channel assignments to the input channels at step 408. Fixed beamforming at step 406 may include generating a first set of one or more spot beams.

At step 410, the platform applies dehopping keys associated with the second user group. Step 410 is optional. In one embodiment, the gateway links are not frequency hopped while in other examples the gateway links are frequency hopped. If frequency hopping is used, the uplink signals are dehopped at step 410. A separate dehopping key can be used for individual users in one example.

At step 412, the platform dynamically forms one or more spot beams for the second user group. Dynamic beamforming can be applied to a second subset of the input channels that are associated with the second user group in one example Dynamic beamforming at step 412 may include generating a second set of one or more spot beams. The second set of spot beams may overlay the first set of one or more spot beams. At step 414, the platform applies frequency hopping to generate output channel assignments for each of the input channels associated with the second user group. The input channels may be frequency hopped using different keys specific for the users in one example. At step 416, the platform performs analog conversion for the full spectrum of the output channels. The full spectrum including the output channels for the fixed channel assignments of the first user group and the dynamic channel assignments of the second group are converted at step 416.

Accordingly, there has been described method of wireless communication that includes receiving at a communication platform a plurality of uplink signals associated with a first user group and a second user group, generating one or more spot beams for the first user group and the second user group, applying a fixed frequency channel assignment to the first user group in the one or more spot beams during a period of time, and applying a dynamic frequency channel assignment to the second user group in the one or more spot beams during the period of time. The fixed frequency assignment includes a first subset of channels within a continuous spectrum allocation for the one or more spot beams. The dynamic frequency channel assignment includes a second subset of channels within the continuous spectrum.

There has been described a wireless communication platform including a feeder link antenna configured to receive a plurality of uplink signals associated with a first user group and a second user group, an adaptive beamformer configured to generate one or more spot beams for the first user group and the second user group, and a digital channelization engine configured to convert a first continuous spectrum allocation comprising the plurality of uplink signals into a plurality of digitized channels. The digital channelization engine applies a fixed frequency channel assignment to the first user group in the one or more spot beams during a period of time. The fixed frequency channel assignment includes a first subset of channels within a second continuous spectrum allocation for the one or more spot beams. The digital channelization engine applies a dynamic frequency channel assignment to the second user group in the one or more spot beams during the period of time. The dynamic frequency channel assignment includes a second subset of channels within the second continuous spectrum.

A method of wireless communication has been described that includes receiving at a communication platform a plurality of uplink signals, converting a first continuous spectrum allocation comprising the plurality of uplink signals into a plurality of input channels, applying fixed beamforming including a fixed output channel assignment for a first subset of the input channels, applying dynamic beamforming including a dynamic output channel assignment for a second subset of the input channels, and generating one or more spot beams based on the fixed beamforming and the dynamic beamforming.

A method of wireless communication has been described that includes determining a plurality of input channels associated with one or more uplink signals, applying to a first subset of the input channels fixed beamforming to generate a plurality of fixed output channels within the continuous frequency spectrum for each of the first subset of input channels, applying to a second subset of the input channels dynamic beamforming to generate a plurality of dynamic output channels within a continuous frequency spectrum for each of the second subset of input channels, and generating one or more spot beams including the plurality of dynamic output channels and the plurality of fixed output channels.

A method of wireless communication has been described that includes receiving at a communication platform a plurality of uplink signals, converting a first continuous spectrum allocation comprising the plurality of uplink signals into a plurality of digitized input channels, and generating a first set of one or more downlink signals including a second continuous spectrum allocation for one or more spot beams. The one or more downlink signals include a set of fixed output channels for a first subset of the plurality of digitized channels. Generating the first set of one or more downlink signals includes frequency hopping a second subset of the plurality of digitized channels.

A method of wireless communication has been described that includes receiving at a communication platform a plurality of uplink signals associated with a first user group and a second user group, converting a first continuous spectrum allocation comprising the plurality of uplink signals into a plurality of digitized channels, determining a user group associated with the plurality of digitized channels, generating one or more spot beams for the first user group and the second user group, frequency hopping a first user group using a first frequency hopping pattern within a second continuous spectrum allocation for the one or more spot beams during a period of time, and frequency hopping a second user group using a second frequency hopping pattern during the period of time. The second frequency hopping pattern is orthogonal to the first frequency hopping pattern.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. A method of wireless communication, comprising:
   receiving at a communication relay platform a plurality of uplink signals associated with a first user group and a second user group;
   generating one or more spot beams for the first user group;
   generating one or more spot beams for the second user group;
   assigning the one or more spot beams generated for the first user group to a first subset of frequency channels, the assignment of the first subset of frequency channels to the first user group being fixed during a period of time, the first subset of channels being one or more of a plurality of orthogonal frequency channels within a continuous frequency spectrum allocation for the one or more spot beams; and
   dynamically assigning the one or more spot beams generated for the second user group to a second subset of the frequency channels during the period of time, the second subset of channels being one or more of the plurality of orthogonal channels, the second subset of channels being distinct from the first subset of channels.

2. The method of claim 1, wherein dynamically assigning to the second user group a second subset of the channels comprises:
   frequency hopping the second user group around the fixed frequency channel assignments of the first user group during the period of time.

3. The method of claim 1, further comprising:
   converting a first continuous frequency spectrum allocation comprising the plurality of uplink signals into a plurality of orthogonal digitized channels; and
   determining a user group associated with each of the plurality of digitized channels.

4. The method of claim 3, further comprising:
   applying dynamic beamforming to a first subset of the plurality of digitized channels that are associated with the first user group; and
   applying fixed beamforming to a second subset of the plurality of digitized channels that are associated with the second user group.

5. The method of claim 1, wherein generating one or more spot beams for the first user group and the second user group includes:
   detecting interference associated with a first downlink signal to the second user group; and
   generating the one or more spot beams to include one or more nulls associated with the first downlink signal.

6. The method of claim 5, wherein generating the one or more spot beams includes:
   generating a first spot beam associated with the first user group, the first spot beam including the fixed channel assignments associated with the first user group; and
   generating a second spot beam associated with the second user group, the second spot beam including the dynamic channel assignments associated with the second user group.

7. A wireless communication platform, comprising:
   a feeder link antenna configured to receive a plurality of uplink signals associated with a first user group and a second user group;
   an adaptive beamformer configured to generate one or more spot beams for the first user group and one or more spot beams for the second user group; and
   a digital channelization engine configured to convert a first continuous frequency spectrum allocation comprising the plurality of uplink signals into a plurality of digitized channels, the digital channelization engine assigns to the first user group in the one or more spot beams a first subset of frequency channels, the assignment of the first subset of channels to the first user group being fixed during a period of time, the first subset of channels being one or more of a plurality of orthogonal frequency channels within a second frequency continuous spectrum allocation for the one or more spot beams, the digital channelization engine dynamically assigns to the second user group in the one or more spot beams a second subset of the frequency channels during the period of time, the second subset of channels being one or more of the plurality of orthogonal channels, the second subset of channels being distinct from the first subset of channels.

8. The wireless communication platform of claim 7, further comprising:
   a frequency hop engine configured to frequency hop the second user group around the fixed frequency channel assignments of the first user group during the period of time.

9. The wireless communication platform of claim 8, wherein:
   the digital channelization engine includes an input channelization engine that generates a plurality of digitized input channels; and
   the digital channelization engine includes an output channelization engine coupled to the frequency hop engine to generate the dynamic frequency channel assignments for the second user group and the fixed frequency channel assignments for the first user group based on the plurality of digitized input channels.

10. The wireless communication platform of claim 9, wherein:
    the adaptive beamformer includes a dynamic beamformer coupled between the input channelization engine and the frequency hop engine to generate one or more downlink signals for the one or more spot beams that are associated with the second user group.

11. The wireless communication platform of claim 10, wherein:
    the adaptive beamformer includes a fixed beamformer coupled between the input channelization engine and the output channelization engine to generate one or more downlink signals for the one or more spot beams that are associated with the first user group.

12. A method of wireless communication, comprising:
    receiving at a communication platform a plurality of uplink signals;
    converting a first continuous spectrum allocation comprising the plurality of uplink signals into a plurality of input channels; and
    applying fixed beamforming for a first subset of the input channels, the fixed beamforming including assigning a first, fixed subset of one or more frequency channels from a plurality of orthogonal frequency channels within a second continuous spectrum allocation;
    concurrently with applying fixed beamforming to the first subset of the input channels, applying dynamic beamforming for a second subset of the input channels, the dynamic beamforming including dynamically assigning a second subset of one or more frequency channels from the plurality of orthogonal frequency channels within the second continuous spectrum allocation, the second subset of channels being distinct from the first subset of channels; and generating one or more spot beams based on the fixed beamforming and the dynamic beamforming.

13. The method of claim 12, wherein:
the one or more spot beams include a first set of one or more spot beams based on the fixed beamforming; and
the one or more spot beams include a second set of one or more spot beams based on the dynamic beamforming.

14. The method of claim 12, wherein:
the one or more spot beams include a first set of one or more spot beams based on the fixed beamforming and the dynamic beamforming, the first set of spot beams including the fixed output channel assignments and the dynamic output channel assignments.

15. A method of wireless communication, comprising:
determining a plurality of input channels associated with one or more uplink signals;
applying to a first subset of the input channels fixed beamforming to generate a plurality of fixed output channels within a continuous frequency spectrum for each of the first subset of input channels;
concurrently with generating the plurality of fixed output channels, applying to a second subset of the input channels dynamic beamforming to generate a plurality of dynamic output channels within the continuous frequency spectrum for each of the second subset of input channels, wherein the fixed output channels and the dynamic output channels being distinct subsets of a plurality of orthogonal frequency channels within the continuous frequency spectrum; and
generating one or more spot beams including the plurality of dynamic output channels and the plurality of fixed output channels.

16. The method of claim 15, wherein:
the one or more uplink signals include a first set of uplink signals including the first subset of input channels associated with a first user group and a second set of uplink signals including the second subset of input channels associated with a second user group.

17. The method of claim 16, wherein the first set of uplink signals are received from a first terminal and the second set of uplink signals are received from a second terminal.

18. The method of claim 17, wherein:
said applying to the second subset of the input channels dynamic beamforming includes frequency hopping the plurality of dynamic output channels of the second user group around the plurality of fixed output channels of the first user group.

19. The method of claim 18, wherein generating the one or more spot beams includes:
generating a first set of one or more spot beams based on the fixed beamforming, the first set of spot beams including the plurality of fixed output channels; and
generating a second set of one or more spot beams based on the dynamic beamforming, the second set of spot beams including the plurality of dynamic output channels.

20. The method of claim 19, wherein generating the second set of one or more spot beams includes:
detecting interference associated with a first spot beam of the second set; and
dynamically generating the first spot beam to include one or more nulls to mitigate the effects of the interference.

21. A method of wireless communication, comprising:
receiving at a communication platform a plurality of uplink signals;
converting a first continuous spectrum allocation comprising the plurality of uplink signals into a plurality of digitized input channels; and
generating a first set of one or more downlink signals including a second continuous spectrum allocation for one or more spot beams, wherein the one or more downlink signals include a set of fixed output channels for a first subset of the plurality of digitized channels,
wherein generating the first set of one or more downlink signals includes frequency hopping a second subset of the plurality of digitized channels concurrently with generating the set of fixed output channels for the first subset of the plurality of digitized channels, the first subset and the second subset being distinct subsets of a plurality of orthogonal digitized channels within a second continuous frequency spectrum.

22. A method of wireless communication, comprising:
receiving at a communication platform a plurality of uplink signals associated with a first user group and a second user group;
converting a first continuous spectrum allocation comprising the plurality of uplink signals into a plurality of digitized channels;
determining a user group associated with the plurality of digitized channels;
generating one or more spot beams for the first user group and the second user group;
frequency hopping a first user group using a first frequency hopping pattern within a second continuous spectrum allocation for the one or more spot beams during a period of time; and
frequency hopping a second user group using a second frequency hopping pattern within the second continuous spectrum allocation for the one or more spot beams during the period of time, the second frequency hopping pattern is orthogonal to the first frequency hopping pattern.

* * * * *